US012145252B2

(12) United States Patent
Nick et al.

(10) Patent No.: US 12,145,252 B2
(45) **Date of Patent: *Nov. 19, 2024**

(54) POWER TOOL

(71) Applicant: MILWAUKEE ELECTRIC TOOL CORPORATION, Brookfield, WI (US)

(72) Inventors: Mackenzie J. Nick, Fond du Lac, WI (US); Michael R. Sande, Waukesha, WI (US); Ian A. Duncan, Milwaukee, WI (US); Jacob P. Schneider, Cedarburg, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/747,524

(22) Filed: May 18, 2022

(65) Prior Publication Data

US 2022/0274246 A1 Sep. 1, 2022

Related U.S. Application Data

(63) Continuation of application No. 16/739,876, filed on Jan. 10, 2020, now Pat. No. 11,338,427.

(Continued)

(51) Int. Cl.

*B25F 5/02* (2006.01)
*A45F 5/00* (2006.01)

(Continued)

(52) U.S. Cl.

CPC .................. *B25F 5/02* (2013.01); *A45F 5/00* (2013.01); *B25F 5/001* (2013.01); *A45F 2005/006* (2013.01); *A45F 5/021* (2013.01)

(58) Field of Classification Search

CPC ............... B25F 5/02; B25F 5/001; A45F 5/00
See application file for complete search history.

(56) References Cited

U.S. PATENT DOCUMENTS 3,886,658 A * 6/1975 Wikoff .................. B23D 45/16 452/160
5,272,813 A * 12/1993 Wolf .................. B27B 17/0008 30/296.1

(Continued)

FOREIGN PATENT DOCUMENTS

CN 107443320 A 12/2017
DE 202011104206 U1 1/2012

(Continued)

OTHER PUBLICATIONS

International Search Report and Written Opinion for Application No. PCT/US2020/013122 dated May 12, 2020 (10 pages).

(Continued)

*Primary Examiner* — Lucas E. A. Palmer
(74) *Attorney, Agent, or Firm* — Michael Best & Friedrich LLP

(57) ABSTRACT

A power tool supportable by a lanyard. The power tool includes a motor housing, a motor arranged in the motor housing, a front housing, an output member extending from the front housing, a gear case, and a gear train arranged in the gear case. The gear train configured to transfer torque from the motor to the output member. The power tool further includes a first fastener securing the front housing to the motor housing and a bracket to which the lanyard is attachable. The bracket is fastened to one of the front housing, the motor housing, or the gear case by a second fastener that does not secure the front housing to the motor housing.

20 Claims, 6 Drawing Sheets

Related U.S. Application Data

(60) Provisional application No. 62/790,629, filed on Jan. 10, 2019.

(51) Int. Cl.
*B25F 5/00* (2006.01)
*A45F 5/02* (2006.01)

(56) References Cited

U.S. PATENT DOCUMENTS

| | | | | |
|---|---|---|---|---|
| 5,797,670 | A | 8/1998 | Snoke et al. | |
| 6,688,407 | B2 * | 2/2004 | Etter | B25F 5/02 24/456 |
| 7,520,029 | B2 * | 4/2009 | Jonsson | A01D 34/90 16/420 |
| 7,681,661 | B2 | 3/2010 | Sakai et al. | |
| 7,917,997 | B2 | 4/2011 | Jonsson | |
| 8,011,541 | B2 | 9/2011 | Mikesell et al. | |
| 8,167,056 | B2 * | 5/2012 | Ito | B25H 3/006 173/171 |
| 8,261,853 | B2 * | 9/2012 | Hachisuka | B25F 5/02 173/171 |
| 8,308,034 | B2 | 11/2012 | Shibata et al. | |
| 8,443,913 | B2 | 5/2013 | Nagasaka et al. | |
| 8,522,895 | B1 | 9/2013 | Honsa | |
| 8,534,375 | B2 | 9/2013 | Matsumoto et al. | |
| 8,573,322 | B2 | 11/2013 | Nagasaka et al. | |
| 9,016,397 | B2 | 4/2015 | Kuroyanagi et al. | |
| 9,526,322 | B2 * | 12/2016 | Moreau | A45F 5/14 |
| 9,883,735 | B2 | 2/2018 | Moreau et al. | |
| 9,914,260 | B2 | 3/2018 | Ellice | |
| 9,986,815 | B2 | 6/2018 | Moreau et al. | |
| 10,040,178 | B2 | 8/2018 | Kondo et al. | |
| 10,045,606 | B2 | 8/2018 | Cirincione, II et al. | |
| 10,668,608 | B2 * | 6/2020 | Meyer | B25C 1/047 |
| 11,498,238 | B2 * | 11/2022 | Huber | B27B 17/0008 |
| 11,559,879 | B2 * | 1/2023 | Machida | B25H 3/006 |
| 2002/0174521 | A1 | 11/2002 | Vidal, Jr. et al. | |
| 2009/0025515 | A1 * | 1/2009 | Shibata | B25F 5/02 81/57.4 |
| 2009/0129876 | A1 * | 5/2009 | Trautner | B23B 45/008 74/366 |
| 2011/0073340 | A1 * | 3/2011 | Matsumoto | B25F 5/02 173/171 |
| 2011/0139479 | A1 * | 6/2011 | Nagasaka | B25F 5/02 173/217 |
| 2012/0085560 | A1 * | 4/2012 | Kuroyanagi | B25F 5/02 248/692 |
| 2013/0062498 | A1 * | 3/2013 | Ito | B25B 21/00 248/672 |
| 2013/0180368 | A1 | 7/2013 | Kumagai et al. | |
| 2014/0097217 | A1 | 4/2014 | Walsh | |
| 2014/0251650 | A1 | 9/2014 | Kondo | |
| 2014/0298664 | A1 * | 10/2014 | Van Bijsterveldt | B27B 17/0008 30/298.4 |
| 2015/0343617 | A1 * | 12/2015 | Kondo | B25B 21/02 173/93 |
| 2017/0119137 | A1 * | 5/2017 | Cirincione, II | B25F 5/02 |
| 2017/0126038 | A1 | 5/2017 | Yoshikawa et al. | |
| 2018/0132600 | A1 * | 5/2018 | Moreau | B25F 5/02 |

FOREIGN PATENT DOCUMENTS

| | | | |
|---|---|---|---|
| EP | 1033207 | B1 | 5/2011 |
| EP | 2332697 | A1 | 6/2011 |
| EP | 2439024 | A1 | 4/2012 |
| EP | 2735075 | B1 | 6/2016 |
| EP | 2735078 | B1 | 10/2017 |
| JP | 2017193044 | A | 10/2017 |
| WO | 2010025742 | A | 3/2010 |

OTHER PUBLICATIONS

Partial Supplementary European Search Report for Application No. 20738106.2 dated Sep. 20, 2022 (14 pages).

Makita, "Impact Wrench—TW1000," Instruction Manual, dated May 2006 (20 pages).

Makita, "Parts Breakdown—TW1000," dated Feb. 2008 (2 pages).

* cited by examiner

POWER TOOL

CROSS-REFERENCE TO RELATED APPLICATIONS

This application is a continuation of U.S. patent application Ser. No. 16/739,876 filed on Jan. 10, 2020, now U.S. Pat. No. 11,338,427, which claims priority to U.S. Provisional Patent Application No. 62/790,629 filed on Jan. 10, 2019, the entire contents of all of which are incorporated herein by reference.

FIELD OF THE INVENTION

The present invention relates to power tools, and more specifically to mounts on power tools that are configured to receive a lanyard to support the power tool.

BACKGROUND OF THE INVENTION

Power tools carried around and used by operators at worksites are sometimes dropped, which can damage the power tool. Sometimes power tools include mounts for receiving a lanyard that can be attached to a user's work belt, such that if the power tool is dropped, the power tool does not hit the ground.

SUMMARY OF THE INVENTION

The present invention provides, in one aspect, a power tool supportable by a lanyard. The power tool comprises a motor housing, a motor arranged in the motor housing, a front housing, an output member extending from the front housing, a gear case, and a gear train arranged in the gear case. The gear train configured to transfer torque from the motor to the output member. The power tool further comprises a first fastener securing the front housing to the motor housing and a bracket to which the lanyard is attachable. The bracket fastened to one of the front housing, the motor housing, or the gear case by a second fastener that does not secure the front housing to the motor housing.

The present invention provides, in another aspect, a power tool supportable by a lanyard. The power tool comprises a motor housing, a motor arranged in the motor housing, a front housing, an output member extending from the front housing, a gear case, and a gear train arranged in the gear case. The gear train configured to transfer torque from the motor to the output member. The power tool further comprises a mounting portion defined on one of the front housing, the motor housing, or the gear case, and a bracket to which the lanyard is attachable. The bracket coupled to the mounting portion.

The present invention provides, in yet another aspect, an impact tool comprising a motor housing, a motor arranged in the motor housing, an impact housing, an impact mechanism arranged in the impact housing, a gear case, and a gear train arranged in the gear case. The gear train configured to transfer torque from the motor to the impact mechanism. The impact tool further comprises a mounting portion having a mounting surface that is substantially flush with a portion of one of the motor housing, the impact housing, or the gear case, and a bracket to which the lanyard is attachable. The bracket coupled to the mounting portion.

Other features and aspects of the invention will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
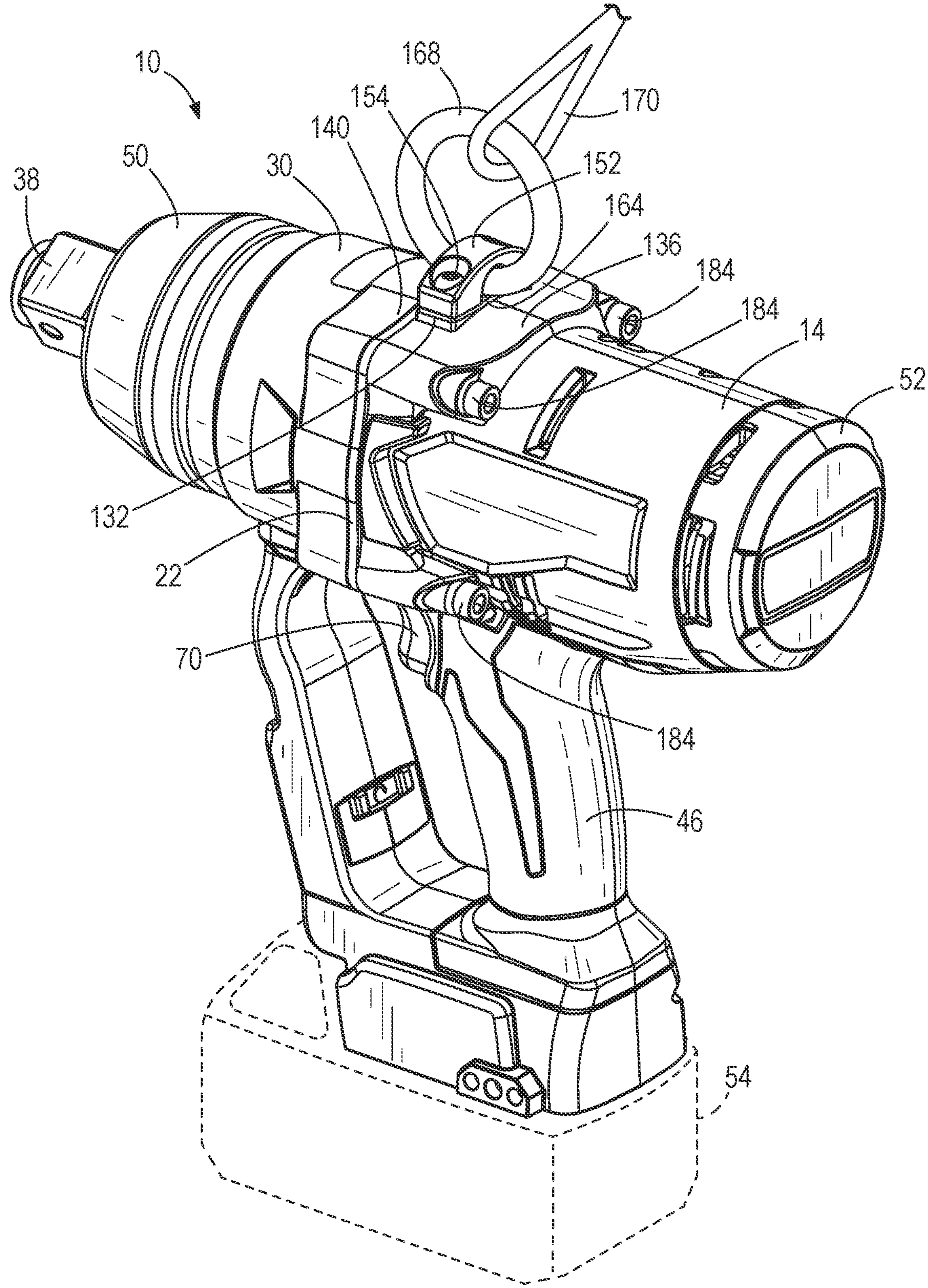
FIG. 1 is a perspective view of an impact wrench according to one embodiment.
Figure 2:
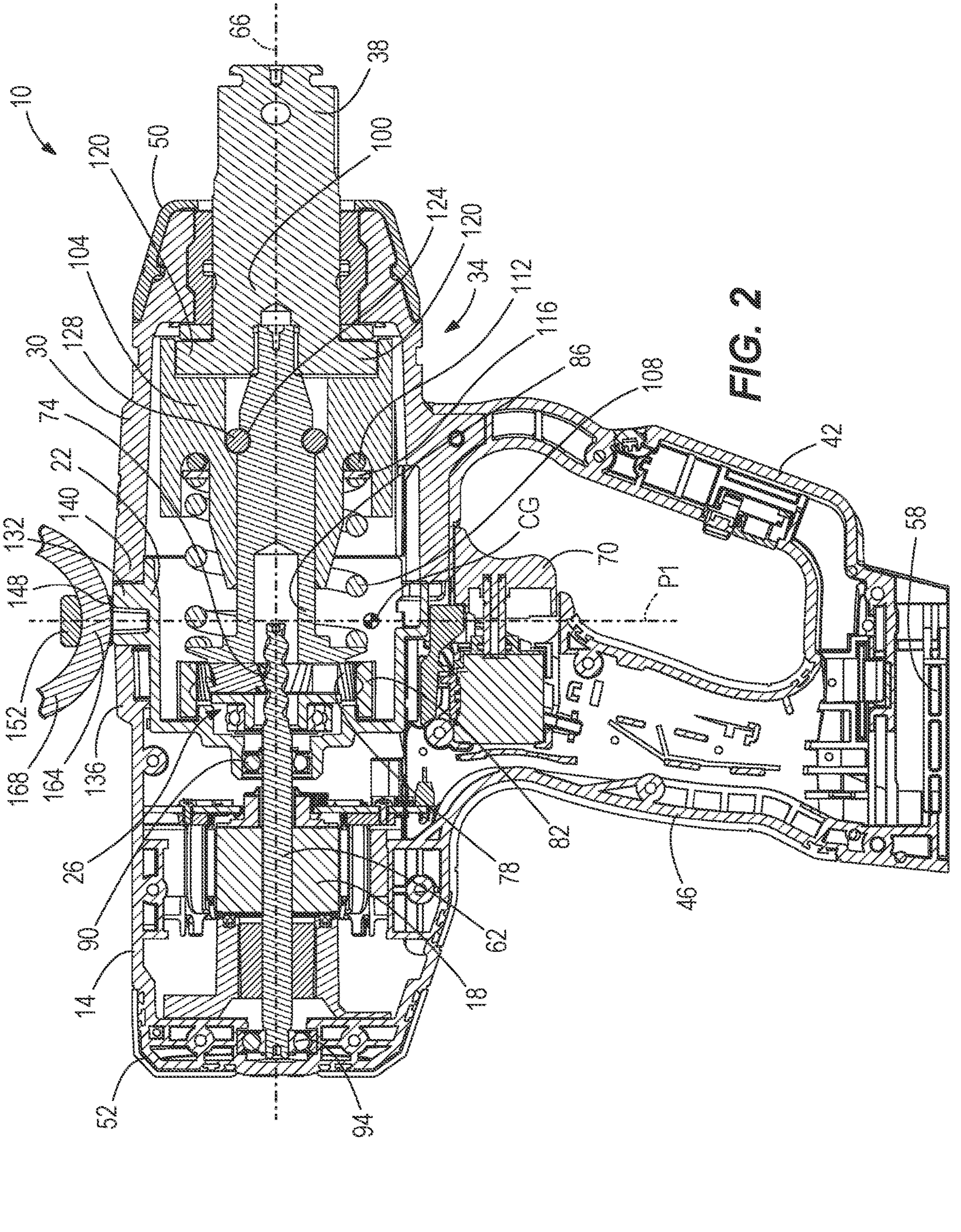
FIG. 2 is a cross-sectional view of the impact wrench of FIG. 1.
Figure 3:
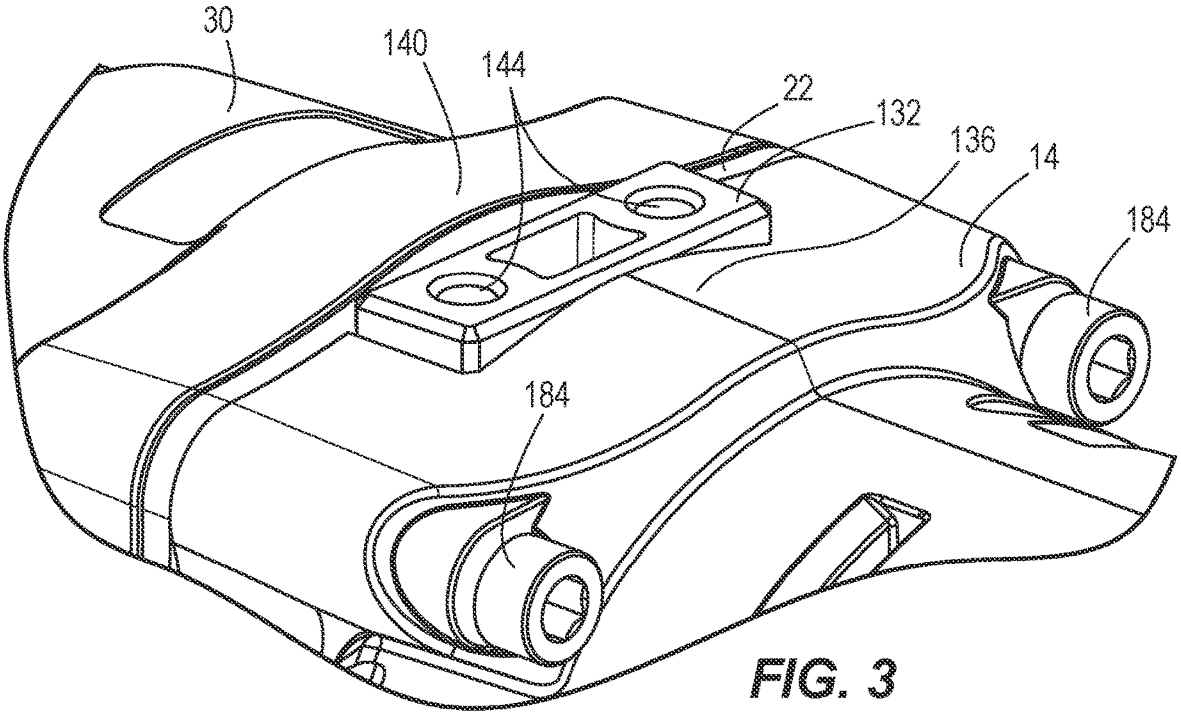
FIG. 3 is a perspective view of the impact wrench of FIG. 1 with a bracket and a support member is removed.
Figure 4:
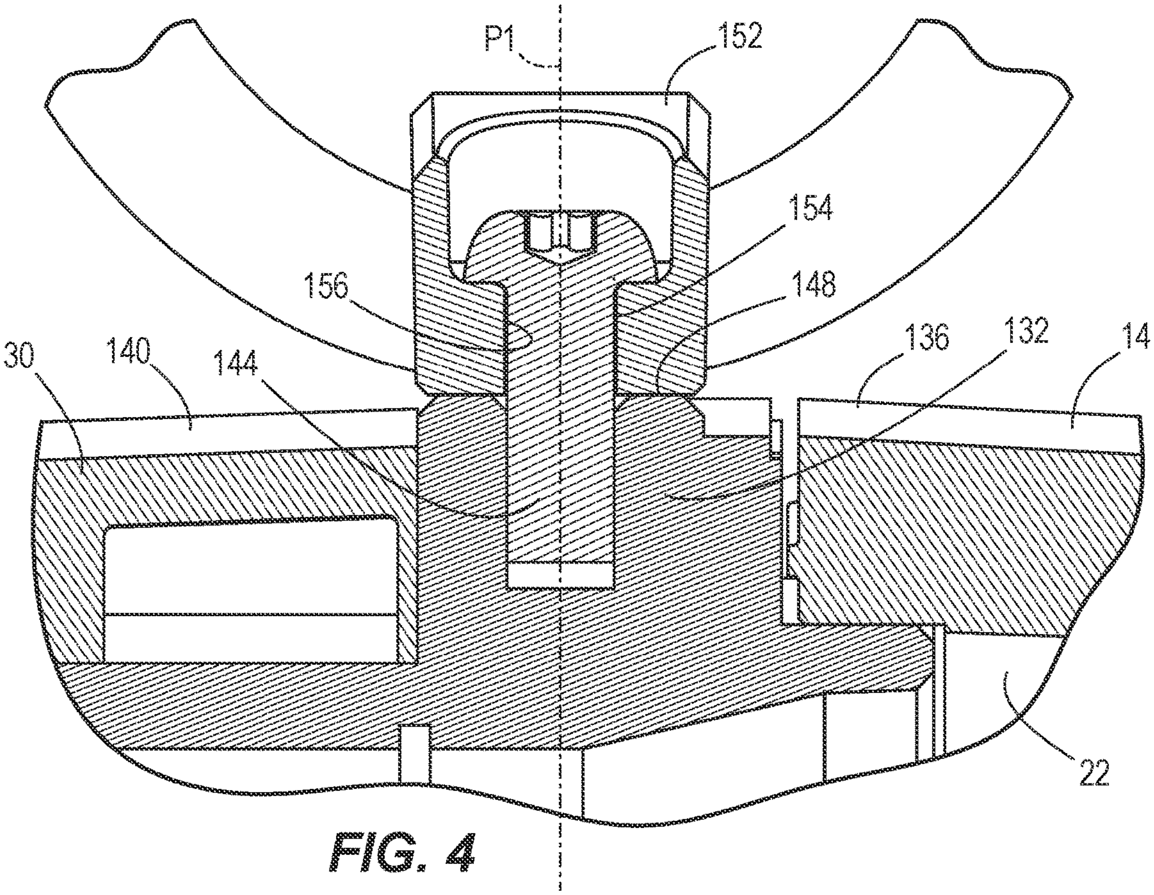
FIG. 4 is an enlarged cross-sectional view of the impact wrench of FIG. 1.

FIGS. 1 and 2 illustrate a power tool in the form of an impact tool or impact wrench 10. The impact wrench 10 includes a motor housing 14 housing an electric motor 18, a gear case 22 at least partially housing a gear train 26, a front or impact housing 30 housing an impact mechanism 34, and an output member, such as a head 38 of an anvil 100. The gear train 26 transfers torque from the motor 18 to the impact mechanism 34, such that the impact mechanism 34 can transfer torque to the head 38. The impact wrench 10 also includes a generally D-shaped handle 42 with a grip 46 that can be grasped by an operator operating the impact wrench 10. A rubber boot 50 overlies a front end of the impact housing 30 to provide protection for the impact housing 30. The impact wrench 10 further includes an end cap 52 coupled to a rear end of the motor housing 14.

The impact wrench 10 has a battery pack 54 (FIG. 1) removably coupled to a battery receptacle 58 (FIG. 2) located at a bottom end of the handle 42. The battery pack 54 is rechargeable and may have a Lithium-based chemistry (e.g., Lithium, Lithium-ion, etc.) or any other suitable chemistry. The motor 18 receives power from the battery pack 54 when the battery pack 54 is coupled to the battery receptacle 38. The motor 18 has an output shaft 62 that is rotatable about an axis 66. The impact wrench 10 also includes a trigger switch 70 provided in the handle 42 that selectively electrically connects the motor 18 and the battery pack 54 to provide DC power to the motor 18.

The gear train 26 is coupled to the motor output shaft 62, and the impact mechanism 34 is coupled to an output of the gear train 26. The gear train 26 may be configured in any of a number of different ways to provide a speed reduction between the output shaft 62 and an input of the impact mechanism 34. With reference to FIG. 2, the illustrated gear train 26 includes a helical pinion 74 formed on the motor output shaft 62, a plurality of helical planet gears 78 meshed with the helical pinion 74, and a helical ring gear 82 meshed with the planet gears 78 and rotationally fixed within the gear case 22. The planet gears 78 are mounted on a camshaft 86 of the impact mechanism 34 such that the camshaft 86 functions as a planet carrier. Accordingly, rotation of the output shaft 62 rotates the planet gears 78, which then advance along the inner circumference of the ring gear 82 and thereby rotate the camshaft 86. The output shaft 62 is rotatably supported by a first or forward bearing 90 and a second or rear bearing 94 that is supported by the end cap 52.

The impact mechanism 34 of the impact wrench 10 will now be described with reference to FIG. 2. The impact mechanism 34 includes the anvil 100 having the head 38, which extends from the impact housing 30. A socket can be coupled to the head 38 for performing work on a workpiece (e.g., a fastener). The impact mechanism 34 is configured to convert the continuous rotational force or torque provided by the motor 18 and gear train 26 to a striking rotational force or intermittent applications of torque to the anvil 100 when the reaction torque on the anvil 100 (e.g., due to engagement between the tool element and a fastener being worked upon) exceeds a certain threshold. In the illustrated embodiment of the impact wrench 10, the impact mechanism 34 includes the camshaft 86, a hammer 104 supported on and axially slidable relative to the camshaft 86, and the anvil 100.

The impact mechanism 34 further includes a spring 108 biasing the hammer 104 toward the front of the impact wrench 10 (i.e., toward the right in FIG. 2). In other words, the spring 108 biases the hammer 104 in an axial direction toward the anvil 100, along the axis 66. A thrust bearing 112 and a thrust washer 116 are positioned between the spring 108 and the hammer 104. The thrust bearing 112 and the thrust washer 116 allow for the spring 108 and the camshaft 86 to continue to rotate relative to the hammer 104 after each impact strike when lugs on the hammer 104 engage with corresponding anvil lugs 120 (FIG. 9) and rotation of the hammer 104 momentarily stops.

The camshaft 86 further includes cam grooves 124 in which corresponding cam balls 128 are received (FIG. 2). The cam balls 128 are in driving engagement with the hammer 104 such that movement of the cam balls 128 within the cam grooves 124 allows for relative axial movement of the hammer 104 along the camshaft 86 when the hammer lugs and the anvil lugs 120 are engaged, rotation of the anvil 100 is seized, and the camshaft 86 continues to rotate. With reference to FIGS. 1 and 2, the anvil 100 includes the head 38 at its distal end. In the illustrated embodiment, the head 38 has a generally square cross-sectional shape in a plane oriented transverse a rotational axis of the anvil 100 (i.e., the axis 66).

With reference to FIGS. 1-4, the gear case 22 includes an upwardly-extending mounting portion 132 that is arranged between a portion 136 of the motor housing 14 and a portion 140 of the impact housing 30. The mounting portion 132 includes a pair of mounting bores 144 extending through a mounting surface 148. The mounting portion 132 protrudes radially through the motor housing 14 such that the bores 144 are exposed to the exterior of the impact wrench 10. In some embodiments, the mounting surface 148 can be substantially flush with the motor housing 14. In other words, the mounting surface 148 can be even with or 2 mm above or below of the top of the portion 136 of the motor housing 14. In some embodiments, the mounting surface 148 can be substantially flush with the portion 140 of the impact housing 30. In other words, the mounting surface 148 can be even with or 2 mm above or below the top of the portion 140 of the impact housing 30. In some embodiments, the mounting surface 148 can be located above the portion 136 of the motor housing 14. In some embodiments, the mounting surface 148 can be located above the portion 140 of the impact housing 30. In some embodiments, the mounting surface 148 may be parallel or substantially parallel to the portion 136 of the motor housing 14. In some embodiments, the mounting surface 148 may be parallel or substantially parallel to the portion 140 of the impact housing 30.

As shown in FIGS. 1, 2, 4, and 9, a bracket 152 can be removably coupled to the mounting portion 132 via a pair of fasteners 154 that extend through a pair of bracket bores 156 that are alignable with the mounting bores 144 of the mounting portion 132. In some embodiments, the mounting portion 132 is formed of metal and the fasteners 154 are also formed of metal. In some embodiments, the bracket 152 is not formed via a stamping process and is instead formed from, e.g., a die casting process, thus making it thicker and less susceptible to being bent or deformed, giving it softer corners, and making it less likely to scratch workpieces. When the bracket 152 is coupled to the mounting portion 132, the first fasteners 154 extend along a first plane P1 (FIG. 4) and a recess 164 (FIG. 9) is defined between the bracket 152 and the mounting portion 132.

Figure 9:
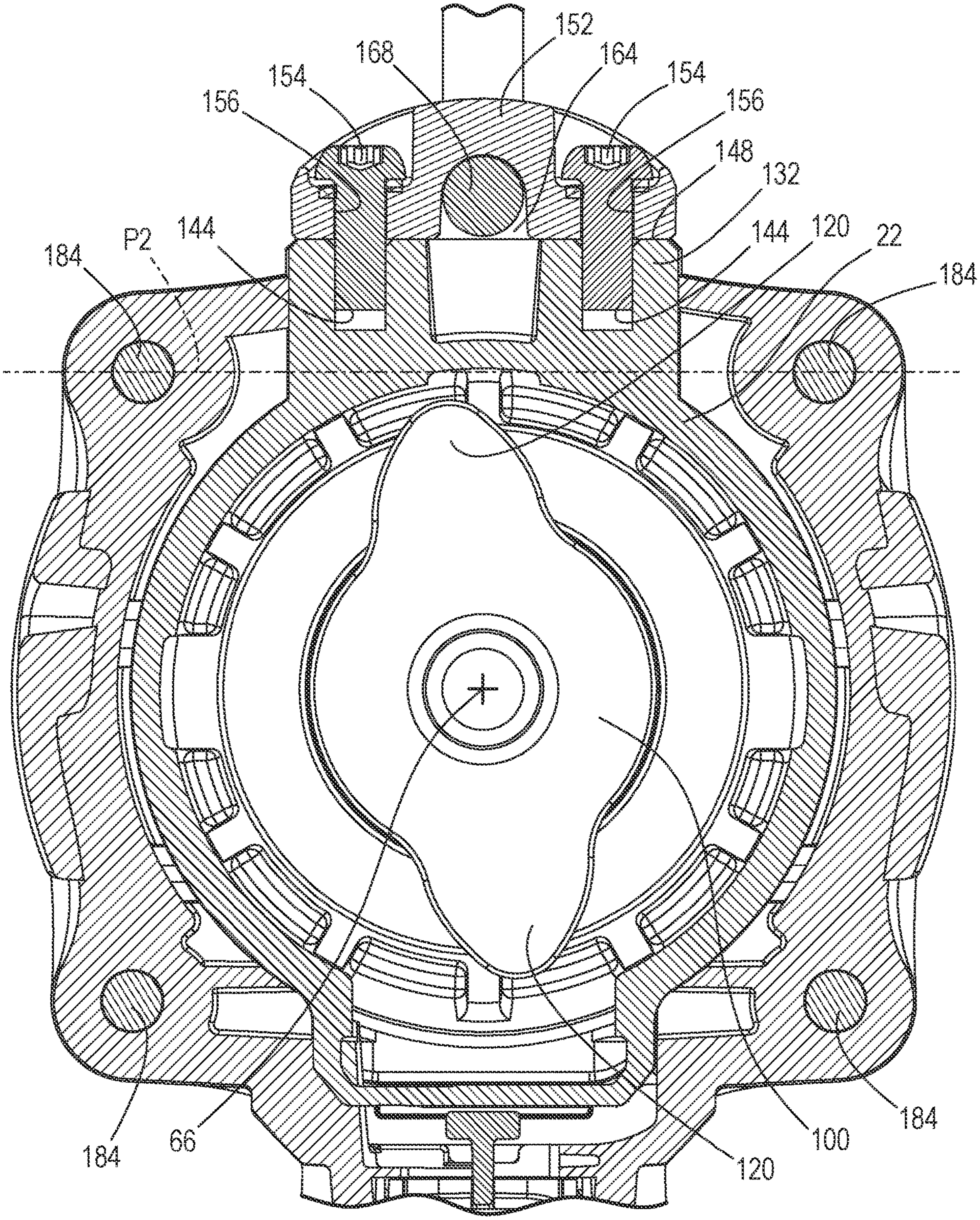
FIG. 9 is an enlarged cross-sectional view of the impact wrench of FIG. 1.

Before fastening the bracket 152 to the mounting portion 132, a securing member such as ring 168 can be arranged within the recess 164. The ring 168 is configured to receive a lanyard 170 (FIG. 1) that is attached to, e.g., a user's belt at a jobsite, such that if the user drops the impact wrench 10, the lanyard 170, ring 168, and bracket 152 will cooperate to prevent the impact wrench 10 from hitting the ground. The ring 168 is configured to pivot within the recess 164, providing flexibility with how the lanyard 170 secures the impact wrench 10. In some embodiments, the plane P1 intersects a center of gravity CG (FIG. 2) of the impact wrench 10, such that if the impact wrench 10 is suspended vertically from the lanyard, the axis 66 will be substantially parallel to the ground. As shown in FIG. 9, at least a portion of the bracket 152 has a substantially arcuate cross-section. In the illustrated embodiment, the bracket 152 is mounted to the mounting portion 132 of the gear case 22. However, in other embodiments, the bracket 152 can be mounted to either the impact housing 30 or the motor housing 14.

Figure 5:
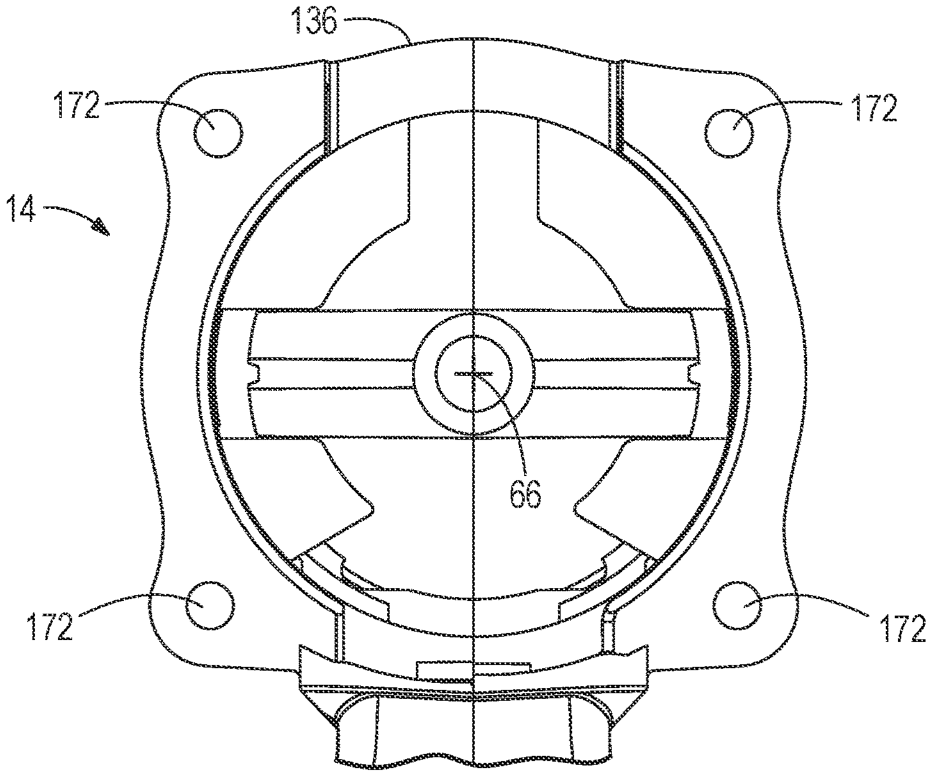
FIG. 5 is a plan view of a motor housing of the impact wrench of FIG. 1.
Figure 6:
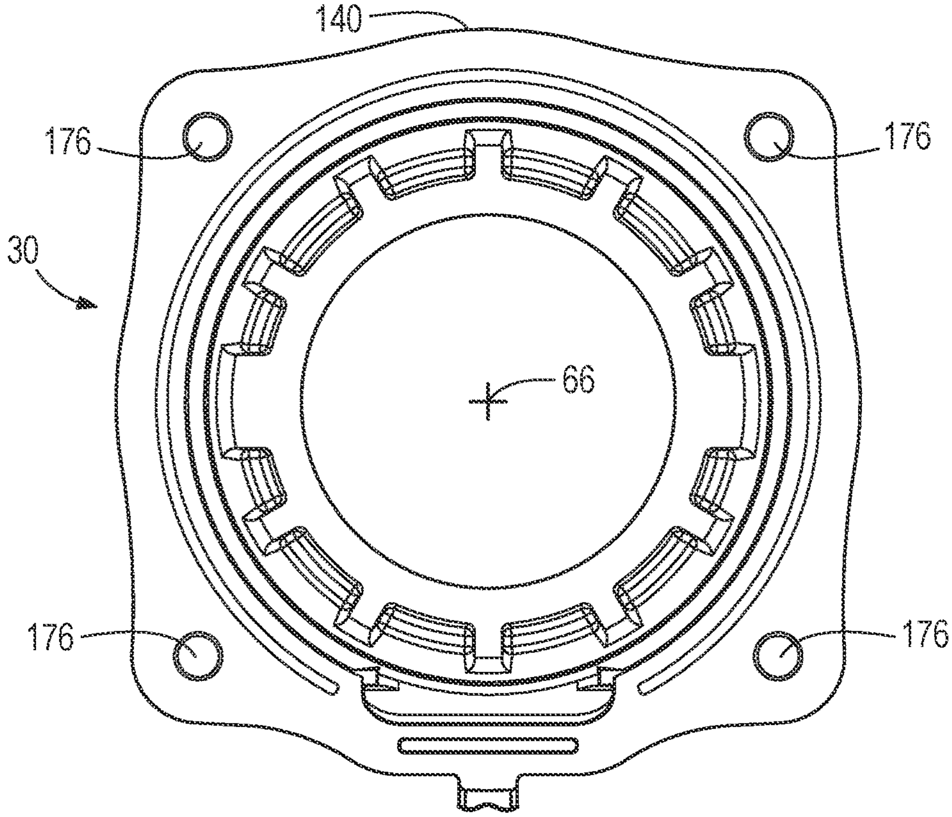
FIG. 6 is a plan view of an impact housing of the impact wrench of FIG. 1.
Figure 7:
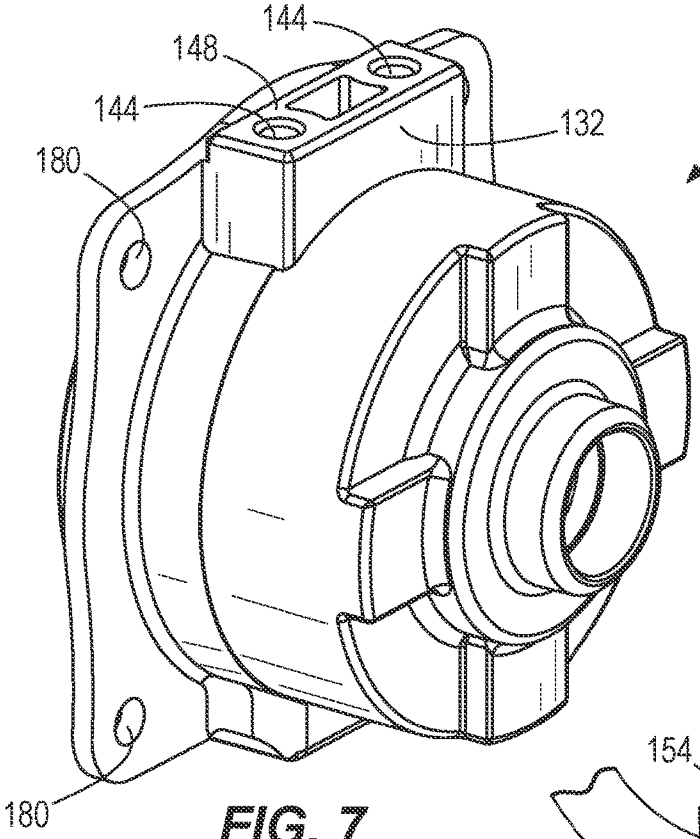
FIG. 7 is a perspective view of a gear case of the impact wrench of FIG. 1.
Figure 8:
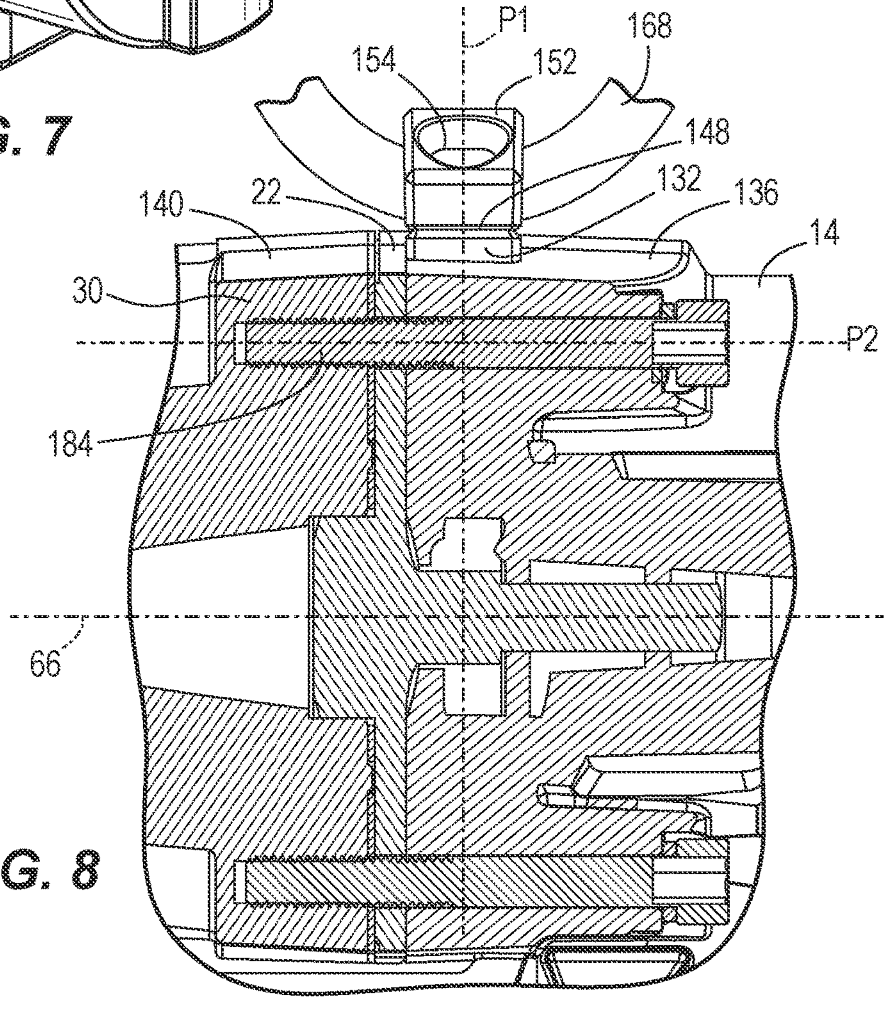
FIG. 8 is an enlarged cross-sectional view of the impact wrench of FIG. 1.

As shown in FIG. 5, the motor housing 14 has four motor housing bores 172. As shown in FIG. 6, the impact housing 30 has four impact housing bores 176. As shown in FIG. 7, the gear case 22 has four gear case bores 180. As shown in FIGS. 1 and 8, four fasteners 184 extend respectively, in the following order, through each of the motor housing bores 172, gear case bores 180, and impact housing bores 176, such that the fasteners 184 start through the motor housing bores 172 and terminate in the impact housing bores 176. In this manner, the impact housing 30 is coupled to the motor housing 14 and the gear case 22 is secured (i.e., clamped) between the motor housing 14 and the impact housing 30. As shown in FIG. 8, the top pair of the fasteners 184 extend along a second plane P2 that is perpendicular to the first plane P1.

Because the bracket 152 is secured to the mounting portion 132 with only the fasteners 154, removal of the fasteners 184 that join the impact housing 30 and gear case 22 to the motor housing 14 is not required to remove the bracket 152 from the mounting portion 132. This arrangement thus affords the user greater convenience when removing the bracket 152 to service or remove the ring 168. Also, because the bracket 152 is not secured to the impact wrench 10 via the fasteners 184, the mounting bracket 152 is more easily shared across different tools having an arrangement of mounting bores that are similar to the arrangement of the mounting bores 144 of the mounting portion 132.

In operation of the impact wrench 10, a user depresses the trigger switch 70 to activate the motor 18, which continuously drives the gear train 26 and the camshaft 86 via the output shaft 62. As the camshaft 86 rotates, the cam balls 128 drive the hammer 104 to co-rotate with the camshaft 86, and the hammer lugs engage, respectively, driven surfaces of the anvil lugs 120 to provide an impact and to rotatably drive the anvil 100 and the tool element. After each impact, the hammer 104 moves or slides rearward along the camshaft 86, away from the anvil 100, so that the hammer lugs disengage the anvil lugs 120. The spring 108 stores some of the rearward energy of the hammer 104 to provide a return mechanism for the hammer 104. After the hammer lugs disengage the respective anvil lugs 120, the hammer 104 continues to rotate and moves or slides forwardly, toward the anvil 100, as the spring 108 releases its stored energy, until the drive surfaces of the hammer lugs re-engage the driven surfaces of the anvil lugs 120 to cause another impact.

Although the invention has been described in detail with reference to certain preferred embodiments, variations and modifications exist within the scope and spirit of one or more independent aspects of the invention as described.

Various features of the invention are set forth in the following claims.

What is claimed is:

1. A power tool supportable by a lanyard, the power tool comprising:
- a motor housing;
- a motor arranged in the motor housing;
- a front housing;
- an output member extending from the front housing;
- a gear case;
- a gear train arranged in the gear case, the gear train configured to transfer torque from the motor to the output member;
- a mounting portion defined on one of the front housing, the motor housing, or the gear case; and
- a bracket to which the lanyard is attachable, the bracket coupled to the mounting portion, wherein the mounting portion is defined on the gear case.

2. The power tool of claim 1, wherein the bracket is removably coupled to the mounting portion by at least one fastener.

3. The power tool of claim 2, wherein the bracket includes a bracket bore that is alignable with a mounting bore within the mounting portion, such that the at least one fastener is insertable through the bracket bore and the mounting bore to couple the bracket to the mounting portion.

4. The power tool of claim 2, wherein the at least one fastener is a first fastener, and wherein the front housing is secured to the motor housing by a second fastener.

5. The power tool of claim 4, wherein the first fastener extends along a first plane that is perpendicular to a second plane on which the second fastener is arranged.

6. The power tool of claim 4, wherein the first fastener extends along a first plane that intersects a center of gravity of the power tool.

7. The power tool of claim 1, wherein the mounting portion includes a mounting surface that is substantially flush with a portion of the front housing.

8. The power tool of claim 1, wherein the mounting portion includes a mounting surface that is substantially flush with a portion of the motor housing.

9. The power tool of claim 1, wherein the bracket is coupled to the lanyard by a support member.

10. The power tool of claim 9, wherein the support member is a ring.

11. The power tool of claim 1, wherein at least a portion of the bracket has an arcuate cross-sectional profile.

12. An impact tool supportable by a lanyard, the impact tool comprising:
- a motor housing;
- a motor arranged in the motor housing;
- an impact housing;
- an output member extending from the impact housing;
- an impact mechanism arranged in the impact housing;
- a gear case;
- a gear train arranged in the gear case, the gear train configured to transfer torque from the motor to the impact mechanism such that the impact mechanism transfers torque to the output member;
- a mounting portion defined on one of the impact housing, the motor housing, or the gear case; and
- a bracket to which the lanyard is attachable, the bracket coupled to the mounting portion, wherein the mounting portion is defined on the gear case.

13. The impact tool of claim 12, wherein the bracket is removably coupled to the mounting portion by at least one fastener.

14. The impact tool of claim 13, wherein the bracket includes a bracket bore that is aligned with a mounting bore within the mounting portion, and wherein the impact tool further includes at least one fastener inserted through the bracket bore and the mounting bore to couple the bracket to the mounting portion.

15. The impact tool of claim 13, wherein the at least one fastener is a first fastener, and wherein the impact housing is secured to the motor housing by a second fastener.

16. The impact tool of claim 15, wherein the second fastener extends along a first plane that is perpendicular to a second plane along which the first fastener extends.

17. The impact tool of claim 12, wherein the mounting portion includes a mounting surface that is substantially flush with a portion of the impact housing.

18. The impact tool of claim 12, wherein the mounting portion includes a mounting surface that is substantially flush with a portion of the motor housing.

19. The impact tool of claim 12, wherein the bracket is coupled to the lanyard by a support member.

20. The impact tool of claim 19, wherein the support member is a ring.

* * * * *